Figure 1:
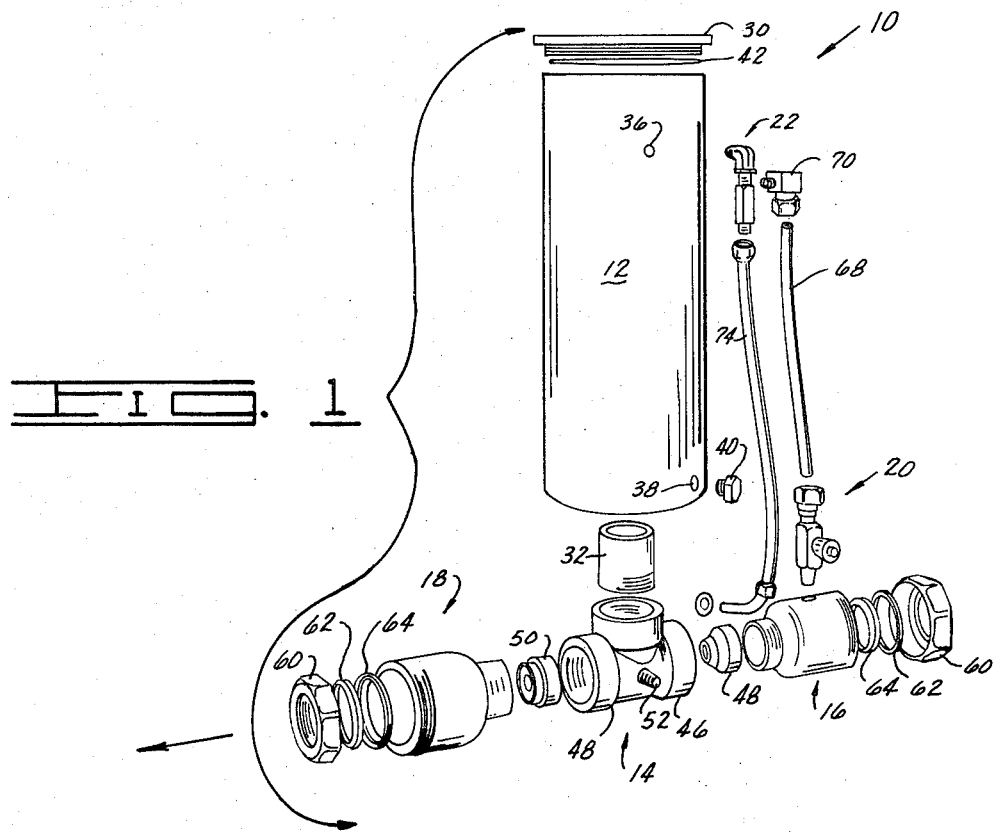

United States Patent [19]
Rasmussen et al.

[11] 3,807,434
[45] Apr. 30, 1974

[54] AUTOMATIC SELF-OPERATING FEEDER

[76] Inventors: Leo O. Rasmussen, 3340 Oakland, Wichita, Kans. 67216; Gerald L. Martin, 1952 Marian, Wichita, Kans. 67218

[22] Filed: Sept. 20, 1971

[21] Appl. No.: 182,046

[52] U.S. Cl. ............... 137/268, 137/205.5, 137/604, 210/169, 239/365, 417/182
[51] Int. Cl. ............................................. F16k 19/00
[58] Field of Search ............. 137/205.5, 268, 564.5, 137/604; 210/169; 239/317, 318, 340, 365; 417/182

[56] References Cited
UNITED STATES PATENTS

| | | | |
|---|---|---|---|
| 2,181,069 | 11/1939 | Robinson | 137/604 |
| 2,563,211 | 8/1951 | Cassese | 137/564.5 |
| 3,595,395 | 7/1971 | Lorenzen | 210/169 |
| 2,737,414 | 3/1956 | Wenzel | 239/318 X |
| 2,931,580 | 4/1960 | Johnson | 239/318 X |
| 3,198,438 | 8/1965 | Hultgren | 239/365 X |
| 2,064,627 | 12/1936 | Paine | 137/205.5 |
| 2,989,979 | 6/1961 | Karlson | 137/268 |
| 3,123,362 | 3/1964 | Evers, Sr. | 239/317 X |

FOREIGN PATENTS OR APPLICATIONS

| | | | |
|---|---|---|---|
| 139,049 | 2/1949 | Australia | 239/317 |
| 1,114,096 | 12/1955 | France | 239/340 |
| 324,147 | 1/1930 | Great Britain | 239/340 |
| 1,182,266 | 1/1959 | France | 239/318 |

Primary Examiner—Robert G. Nilson
Attorney, Agent, or Firm—John H. Widdowson

[57] ABSTRACT

An automatic chemical feeder for a fluid flow stream has a chemical reservoir and a fluid flow operated pressure differential assembly. The preferred venturi or orifice assembly has replaceable sections, and is connected in the fluid flow stream. It is in fluid communication with the reservoir to receive fluid therefrom to mix in the fluid flow stream.

2 Claims, 2 Drawing Figures

PATENTED APR 30 1974

3,807,434

INVENTORS
LEO O. RASMUSSEN AND
GERALD L. MARTIN

BY John H. Widdowson
ATTORNEY

AUTOMATIC SELF-OPERATING FEEDER

Numerous types of self-powered chemical feeding devices are known in the prior art as operable to add chemicals to a flow stream. However, the prior art devices are quite complex in structure and not adapted for easy installation in a fluid conduit system. Additionally, the prior art devices are limited in the range of flow rates into which an additive chemical can be introduced into a fluid stream and the devices are limited in the capacity of fluid stream into which an additive chemical can be introduced.

In a preferred embodiment of this invention, an automatic self-operating feeder includes a housing assembly connectable by short conduits to a fluid flow line with an orifice assembly in the housing in the fluid flow stream. A reservoir used for an additive chemical is connected between the housing inlet conduit and the orifice assembly by conduits; a check valve and a control valve are adapted to regulate and control fluid flow into and from the reservoir. The orifice assembly is provided with removable orifices or throat portions and an adjustable injection inlet conduit. The housing and reservoir are preferably constructed of polyvinyl chloride material or the like which will have substantially no reaction to a great many elements. The reservoir is preferably sealed with a cover and mounted adjacent the housing assembly. During operation a chemical in liquid or solid form is placed in the reservoir and as fluid flows through the housing in the flow stream a portion of it passes through the control valve into the reservoir to be mixed with the chemical in the reservoir then passed out of the reservoir through the check valve into a low pressure zone at the orifice assembly between the orifices and into the flow stream. The control valve regulates flow into the reservoir and the check valve permits flow from the reservoir. The combination of orifice sizes, chemical additive conduit position in the orifice assembly and control valve setting is used to precisely regulate the amount of chemical added to the fluid stream.

One object of this invention is to provide a self-operating chemical feeder overcoming the disadvantages of the prior art devices.

Still, one other object of this invention is to provide a self-operating chemical feeder having an orifice assembly with removable orifices used as a point at which to inject a chemical additive into a fluid stream.

Yet, another object of this invention is to provide a self-operating chemical feeder having a reservoir coupled with an inlet control valve and an outlet check valve connected with an orifice assembly in a fluid flow stream adapted to take fluid from the stream, mix it with the chemical and inject it into the fluid stream at the orifice assembly.

Yet an additional object of this invention is to provide a self-operating chemical feeder that will accurately proportion a chemical additive in a fluid stream by using an orifice assembly with removable orifices that may be varied in size, and a valve controlled fluid flow through a chemical storage reservoir.

An additional object of this invention is to provide a self-operated chemical feeder than can be easily installed in an existing fluid carrying conduit system as a compact self-contained unit.

Figure 2:
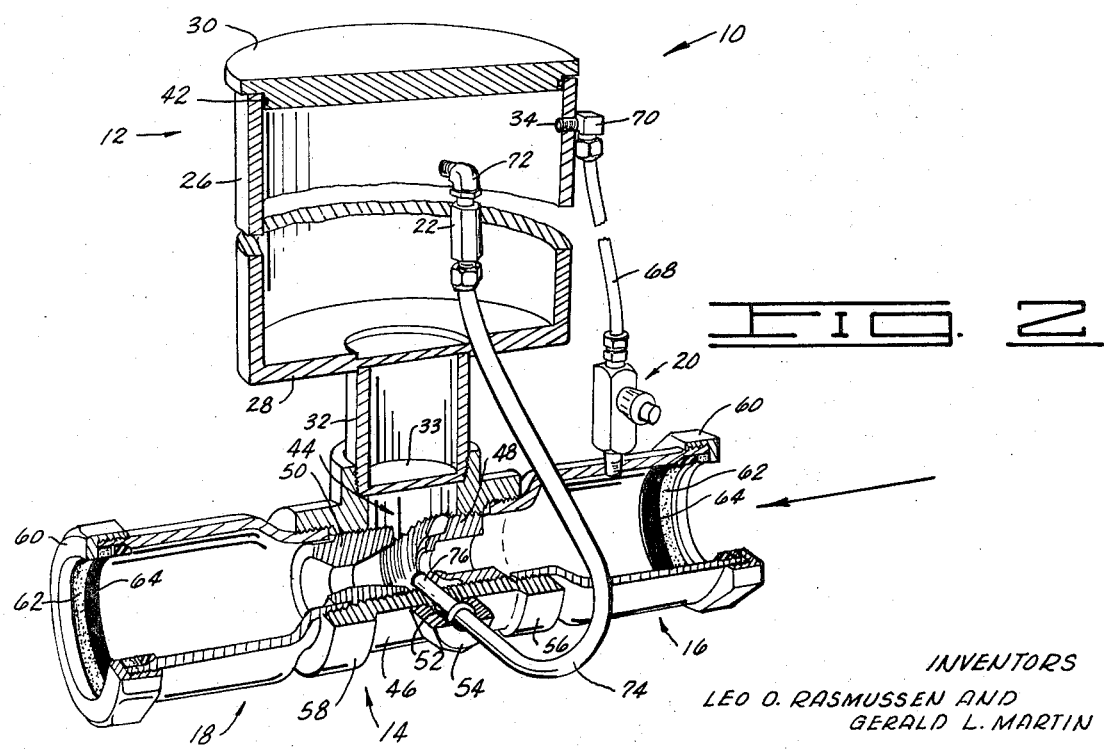

Various other objects, advantages, and features of the invention will become apparent to those skilled in the art from the following discussion, taken in conjunction with the accompanying drawings, in which:

FIG. 1 is an exploded perspective view of the self-operating feeder and conduit couplings, and FIG. 2 is a perspective view of the assembled self-operating chemical feeder partially cut away for clarity and having the fluid flow direction therethrough indicated by an arrow.

The following is a discussion and description of preferred specific embodiments of the new self-operated chemical feeder of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a self-operating chemical feeder of this invention, indicated generally at 10, is shown with the components thereof in an exploded relation. The self-operating feeder 10 includes a reservoir 12 mounted on the orifice assembly 14, a conduit inlet 16 and conduit outlet 18 to the orifice assembly housing 14, a control valve 20 and conduit from the inlet 16 to the reservoir 12, and a check valve 22 with a conduit from the reservoir 12 to the orifice assembly 14.

The reservoir 12 includes a container with integral sidewalls 26 and bottom 28, a sealable cover 30 and a pedestal support 32. An inlet 34 and outlet 36 are provided in the upper portion of the reservoir 12 at the same level, and a drain outlet 38 and drain plug 40 are provided at the bottom of the reservoir 12. The inlet 34 and outlet 36 are preferably at the same fluid level in the reservoir 12 so as to provide better control of the fluid in the reservoir 12. The reservoir 12 is preferably sealable except for the inlet and outlet for reasons to be described.

As can be seen in the drawings, the preferred configuration of the reservoir 12 is with cylindrical sidewalls 26 and a flat bottom 28 and cover 30. This cylindrical configuration of the reservoir is preferred because of simplicity and ease of construction, but it is to be understood that other configurations of the reservoir will operate similarly. Also, the preferred reservoir 12 is shown supported on the orifice assembly housing 14; this is done primarily to provide a compact unit and has little relation to operation of the device. The preferred cylindrical reservoir has an indented portion in the bottom 28 thereof adapted to receive the pedestal 32. The pedestal 32 is threadedly mounted on the top of the orifice housing 14 and flat on the top thereof so the reservoir 12 can sit on it. As shown in the drawings the pedestal 32 is a short conduit with a plug 33 in its lower end portion. The cover 30 of the reservoir 12 fits down inside the cylindrical sidewall 26 a short distance sufficient that the O-ring 42 seals the cavity of the reservoir 12.

The orifice assembly housing 14 includes the orifice assembly, generally indicated at 44, the Tee-shaped housing 46 and the removable orifices 48 and 50. The inlet conduit 16 and the outlet conduit 18 are threadedly secured to the respective inlet and outlet ends of the housing 46. The housing 46 is essentially a Tee-like fitting having the inner portion thereof threaded to mount the removable orifices 48 and 50 and with a small threaded extension 52 on one side for the chemical inlet conduit to be connected.

The chemical inlet extension 52 is threaded on the outside and has a passageway through the inside adapted to pass a conduit as shown in FIG. 2 and secure it by a compression nut and collar 54. The orifices are smaller in outside diameter than the inlet 56 and outlet 58 portions of the housing 46 and are adapted to be threadedly engaged in the smaller inner portion of the housing 46. When installed, the orifices 48 and 50 are in an abutting relation with the inlet and outlet conduits 16 and 18 respectively so as to lock them in place and prevent fluid flowing through the feeder 10 from displacing them.

The inlet conduit 16 and the outlet conduit 18 are preferably enlarged fittings as shown in the drawings which are fitted with compression seals so the feeder 10 can be easily connected in and removed from conduit system. The compression seals include a compression nut 60, a hard compression ring 62 and a gasket ring 64. As can be seen in the drawings, the compression nut 60 is screwed on the threaded out ends of the conduits 16 and 18 so as to turn on the compression ring 62 and compress the gasket ring 64 and bring the gasket ring 64 into firm sealing contact with a conduit placed in the ends of the conduits 16 and 18 and seal the fluid flow stream. The compression seals are provided in order that the feeder 10 can be easily installed in and removed from a conduit system. Removal of the feeder 10 is essential for changing the orifices 48 and 50. In actual installation of the feeder 10 conduits from the system are inserted in the end portions of the inlet and outlet conduits a sufficient distance for the compression seals to properly attach.

The shape of the orifices 48 and 50 shown in detail in the drawings are to be understood not to unduly restrict this invention. The orifices 48 and 50 shown are ones that have been satisfactorily used in practice. It is to be understood that either or both of the orifices may have the venturi shape as orifice 50 shown; or either or both of the orifices can have the shape of orifice 48 shown; or either or both of the orifices can have any other suitable shape.

The control valve 20 is threadedly joined with the inlet conduit 16 and connected to a reservoir inlet conduit 68 and a reservoir inlet fitting 70 secured to the reservoir inlet 34. The control valve 20 is an accurately adjustable flow type valve preferably a needle type valve. The control valve 20 is used to accurately control the fluid flow rate into the reservoir as will be described. On the reservoir outlet 36, the check valve 22 and conduit are connected. The check valve 22 is threadedly mounted on the sidewall 26 by a fitting 72 so as to be in fluid communication with the interior of the reservoir. The check valve 22 is adapted to permit fluid flow from the reservoir 12 and prevent fluid flow into it. The reservoir outlet conduit 74 is a flexible conduit connected to the check valve 22 on one end and has the other end extending into the housing through the extension 52 and is held in place by the compression nut 54 and collar. The housing end portion of the reservoir outlet conduit 74 is referred to as the injector conduit 76. Changing position of the inner end of the injector conduit 76 is a means used to adjust the flow rate from the reservoir as will be described. It is to be noted that the injector conduit 76 is normally moved from the extreme outer portion of the inside of the housing 46 to the center portion of the venturi 44 to achieve a proper flow rate adjustment. As the injector conduit is moved into and out of the housing, the compression nut 54 and collar seal the conduit; and when loosened, allow it to be slid in the extension 52 to the desired position.

In operation of the automatic feeder 10 of this invention, the inlet and outlet conduits 16 and 18 are connected in a fluid flow system in which an additive of some type is to be added to the fluid. Typical uses of the feeder 10 of this invention are swimming pool filter systems, crude oil treaters, or any other application where a precise, relatively small amount of fluid is to be added to a fluid flow stream. Generally, any form of chemical can be added to the fluid stream whether it be a liquid, granular, pelletized or in solid chunks so long as it will mix with or dissolve in the fluid to which it is to be added. With the automatic feeder connected in a fluid flow system the reservoir 12 can be charged with the additive chemical and the cover 30 secured; then the automatic feeder 10 is ready for operation. When fluid flows through the orifice assembly 14, the very nature of it causes the fluid velocity to increase and the pressure to drop as it passes through the orifices. The pressure drop at the venturi is used to pull the chemical additive from the reservoir 12; this is accomplished by the reservoir 12 being sealed and connected between the venturi 44 and the inlet conduit 16, so the pressure differential between the venturi 44 and the inlet conduit 16 causes fluid to be moved from the reservoir. The reservoir 12 is adapted to be maintained at a pressure below the inlet flow stream pressure. It is sufficiently sealed by the O-ring 42 in the cover 30 so that leakage is minimized.

The control valve 20 functions to regulate the rate of fluid flow into the reservoir 12 from the fluid stream. The control valve is precisely adjustable in its opening so as to give an accurately regulatable flow into the reservoir. The injector conduit 76 is also used to adjust the flow rate through the reservoir 12 because its position in the venturi regulates the amount of pressure drop between it and the inlet; it regulates the amount of suction on the reservoir. When the end of the injector conduit 76 is in the outer portion of the venturi 44, it is in a high pressure region and has a low amount of suction and a lower pressure differential relative to the inlet conduit 16. When the end of the injector conduit 76 is in the center portion of the venturi 44, it is in a low pressure region and has a high amount of suction and a high pressure differential relative to the inlet conduit 16.

In actual operation of the automatic feeder 10 of this invention, it has been found that it may be necessary to coordinate adjustment of the injection conduit 76 and the control valve 20 to obtain a desired flow rate from the reservoir 12. Under conditions of a constant flow rate in the fluid stream, the position of the injection conduit 76 regulates the amount of pressure differential on the reservoir which in turn will affect the flow rate through the reservoir for a constant control valve setting. Also, for a constant fluid system flow rate and injection conduit position, adjustment of the control valve 20 will control the flow rate through the reservoir 12 by regulating the flow rate into it. It is obvious that controlling the combination of the two described variables may be needed if the adjustment of either one alone will not provide the desired additive flow rate. The desired additive flow rate is a factor to be determined by the particular application of the automatic feeder 10 and can be checked for proper proportions at a point downstream of the automatic feeder 10.

EXAMPLE

By way of example for a particular use of the automatic feeder 10 of this invention, the following is included:

The automatic feeder 10 was installed on an Olympic size swimming pool filter system downstream of the filter and before it entered the pool. The filter system pump provided 148 gallons per hour (gph) at a head pressure of 15 feet. The chemical reservoir had a capacity of 1.5 gallons, a one-fourth inch diameter inlet conduit and a three-eighths inch diameter outlet conduit. The orifice assembly 14 was fitted with orifices both having an internal diameter of one-half inch. The reservoir was charged with granular calcium hyperchloride, a common chlorinating agent for swimming pools. In the steady state operation of the swimming pool filter system, a flow rate of 60 gph was measured through the reservoir. At the flow rate of 60 gph a pressure drop of 2 to 3 pounds per square inch was noted across the automatic feeder 10. For continuous operation of the filtering system at the described locations, it maintained a nominal PH in the swimming pool during normal use.

In the manufacture of the automatic feeder 10 of this invention, it is obvious that all the components, except possibly the control valve 20, can be easily constructed of a plastic like material such as polyvinyl chloride or the like which is of sufficient thickness to resist pressure of the fluids and resistive to chemicals that may be used as additives. The self-operating feeder 10 can be constructed in a size sufficient to accommodate a substantial quantity of chemical additive and to accommodate a variance of flow rates and pressures for both the chemical additive and the fluid stream flow rates.

In the use and operation of the self-operating feeder 10 of this invention, it is seen that same provides a self-operative apparatus due to the flow-powered and self-proportioning characteristics due to the use of a venturi created pressure differential to inject an additive chemical into the fluid flow stream. The self-operating feeder 10 is easily connectable in and removable from a fluid flow conduit system due to the compression type couplings. The feeder structure is compact due to the reservoir 12 mountable on the venturi assembly 14, and it is adaptable for use in a wide range of flow rates and for a variety of different fluids due to the removable and interchangeable orifices.

As will be apparent from the foregoing description of the applicant's self-operating feeder, relatively simple and inexpensive means have been provided to inject a fluid chemical additive into a fluid flow stream. The self-operating feeder is economical to manufacture, simple to use, compact in size and may be adapted for use with a variety of flow rates and fluids as desired.

While the invention has been described in conjunction with preferred specific embodiments thereof, it will be understood that this description is intended to illustrate and not limit the scope of the invention, which is defined by the following claims.

We claim:

1. An automatic chemical feeding means which comprises a reservoir for chemicals having an inlet and an outlet, said inlet and said outlet being positioned in the upper portion of said reservoir at about the same height, an essentially T-shaped conduit housing attached to the bottom of said reservoir, said conduit housing including an internal structure defining a first threaded section, a second threaded section abutting said first threaded section and having a diameter smaller than same, a third threaded section juxtaposed to said second section, and a fourth threaded section contiguous to said third section and including a diameter larger than same, said conduit housing additionally having a generally cylindrical shaped groove situated thereon and a threaded aperture piercing said second threaded section in proximity to where said third threaded section is juxtaposed thereto, said groove having threaded walls whereon said reservoir removably lodges, a conduit extension member having one end threaded for removably lodging within said threaded aperture, an orifice assembly situated within said housing, said orifice assembly comprising a first orifice conduit including a plurality of threads positioned on the exterior surface thereof which removably lodge on said second threaded section, a second orifice conduit including a threaded exterior surface which removably engages with said third threaded section, said first orifice conduit includes an internal diameter which tapers from said first threaded section, said second orifice conduit comprises an interior defined by a tapering diameter, a generally constant diameter abutting said tapering diameter, and a diverging diameter attaching with said constant diameter, said diverging diameter diverges towards said fourth threaded section, said housing additionally having a cavity positioned between said first and said second orifice conduits which communicates with said aperture, an inlet conduit having a first end and a second end and an outlet opening, said first end being threaded for removably engaging with said first threaded section, an outlet conduit including a first end and a second end, said first end including a plurality of threads thereon for removably lodging on said fourth threaded section, an inlet hose connected from said outlet opening of said inlet conduit to said inlet of said reservoir, and an outlet hose having a first end connected to said outlet of said reservoir and a second end removably attached to said conduit extension member, said second end adjustably protrudes within said cavity while lodging in said conduit extension member, and said second end of said inlet conduit and said second end of said outlet conduit each include a means for sealing said inlet conduit and said outlet conduit to a conduit system by compression.

2. The automatic chemical feeding means of claim 1 wherein said means for sealing situated on said second end of said inlet conduit and on said second end of said outlet conduit comprises a multiplicity of sealing threads situated on the exterior surface of each of said second end of said inlet conduit and of said outlet conduit, a recess positioned underneath said sealing threads and circumscribing the interior surface area of each of said inlet conduit and of said outlet conduit, a gasket ring and a compression ring situated within said recess of each of said conduits, said compression ring being adjacent to said gasket ring, and a compression nut removably mounted on said sealing threads of each of said second end of said inlet and of said outlet conduits, said compression nut including a flanged portion which abuts said ring and secures same and said gasket within said recess such that when said nut is tightened said ring is compressed against said gasket to expand same.

* * * * *